July 13, 1948.  P. M. EABY  2,445,212
LEVEL WINDING ATTACHMENT FOR REELS
Filed Oct. 21, 1946
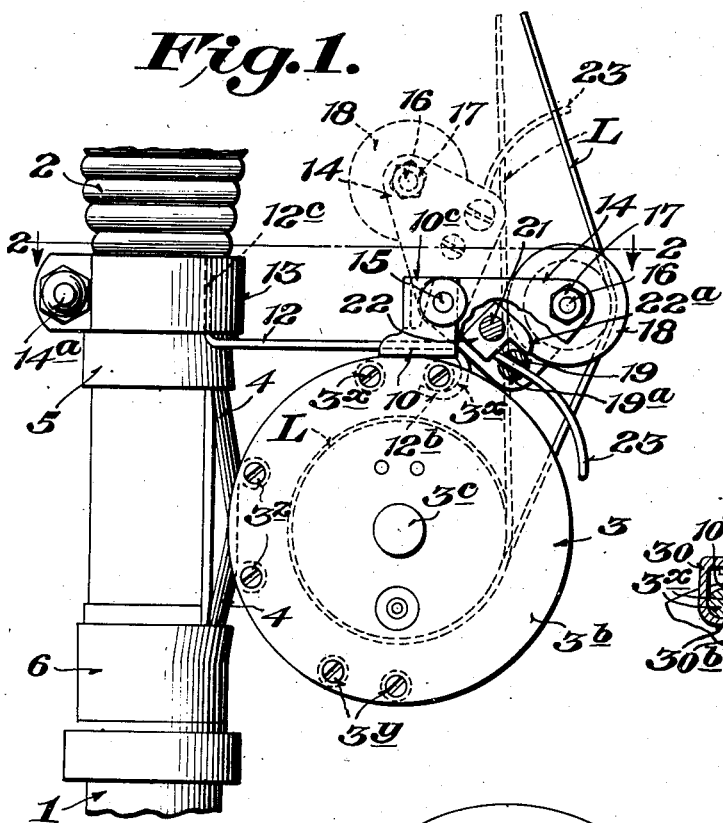
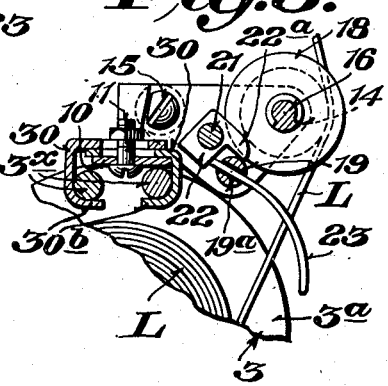
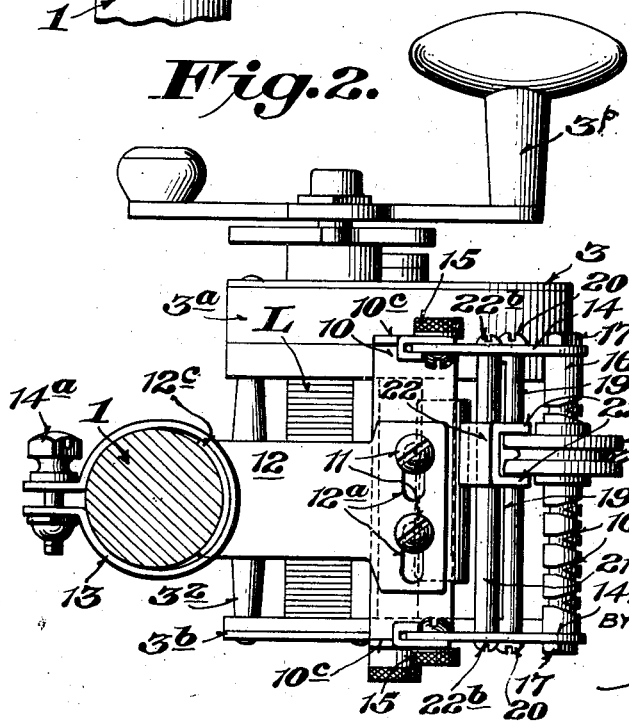
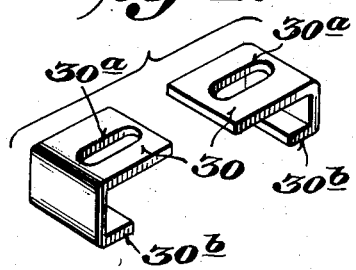
Inventor
Paul M. Eaby (deceased)
By Alice V. Urey (Executrix)
By Dowell & Dowell
Attorneys Patented July 13, 1948

2,445,212

UNITED STATES PATENT OFFICE 2,445,212

LEVEL WINDING ATTACHMENT FOR REELS

Paul M. Eaby, deceased, late of Lancaster, Pa., by Alice Virginia Urey executrix, Lancaster, Pa., assignor to Grace A. Eaby Application October 21, 1946, Serial No. 704,716

7 Claims. (Cl. 242—84.4)

This invention relates to fishing reels, and the principal object thereof is to provide a novel level winding mechanism adapted to be detachably mounted on a conventional fishing reel as an attachment thereto rather than as an integral part thereof, said level winding mechanism carrying a line engaging pulley adapted to be pivoted or swung from operative position into inoperative position, and vice versa, said pulley being reciprocated on its shaft across the reel drum by means of a double ended worm, and said guide pulley being rotated and thus reciprocated solely by the frictional engagement of the fishing line on the periphery of the pulley.

The invention will be explained with reference to the accompanying drawing, which illustrates one practical embodiment thereof, to enable others familiar with the art to adopt and use the same; and will summarize in the claims, the novel features of construction, and novel combinations of parts, for which protection is desired.

In said drawing:

Figure 1 is a side elevation of the novel level winding attachment mounted upon the reel of a fishing rod showing in dotted lines the pulley swung into inoperative position; and showing one means for mounting the attachment on the rod and reel.

Fig. 2 is a transverse section on the line 2—2, Figure 1.

Fig. 3 is a detail section showing another means for mounting the attachment on the reel.

Fig. 4 is an expanded perspective view of the mounting clamps shown in Figure 3.

As shown, the fishing rod 1 is provided with a forward hand grip 2 in the usual manner, and rod 1 carries a fishing reel 3 of any conventional type having a base provided with opposed tongues 4 adapted to be slipped under a fixed ferrule 5 and a shiftable ferrule 6 mounted on the rod so as to be locked thereon in the usual manner. Fishing reel 3 is provided with opposite side plates 3a and 3b in which is journaled the reel shaft 3c upon which the fishing line L is wound, shaft 3c being rotated by a hand crank 3b in the usual manner. The end plates 3a and 3b are provided with pairs of spaced cross bars 3x, 3y, and 3z in the usual manner, one pair of cross bars, 3x, being disposed at the front end of the reel. The above parts form no part of the present invention.

The novel level winding attachment, as shown in Fig. 2, comprises a metallic base strip 10 of substantially rectangular shape and of length to extend between the side plates 3a, 3b of a reel 3, the same base plate 10 having a pair of tapped bores therein adjacent its center adapted to receive screws 11 which pass through a pair of slots 12a in a supporting bracket 12 having its upper end bent to form a hook 12b (Fig. 1) adapted to fit around one of the adjacent cross rods 3x of the reel. The base of the bracket 12 is outturned as at 12c and arched to conform to the curvature of the rod 1, and a split clamp 13 is placed around the rod and over the outturned flange 12c, the clamp 13 carrying a bolt 14 whereby the same may be contracted around the rod to firmly secure the base 12c of the bracket 12 thereto, as clearly shown in Figs. 1 and 2.

The ends of the base plate 10 are outturned as at 10c to form ears which are perforated, and in which a swingable frame is pivoted, the frame consisting of triangular end plates 14 which are attached to the ears 10c by means of screws 15 or the like, said screws 15 being disposed at one corner of the triangular plates 14. At another corner of the frame is a non-rotatable shaft 16 secured to the end plates 14 by screws 17 or the like, said fixed shaft 16 having a double ended worm 16a formed therein between its ends. On the double ended worm 16a is a guide pulley 18 having a groove 18a in its periphery adapted to receive the fishing line L when the pulley is in operative position shown in full lines in Figs. 1 and 2.

Adjacent the other corner of the pivoted frame is a cross bar 19 having a longitudinally extending slot 19a therein co-extensive with the double ended worm 16a on the fixed shaft 16, said cross rod 19 being secured by screws 20 to said end plates 14. Adjacent to and parallel with the cross bar 19 is a cross bar 21 secured by screws 22 to the end plates 14 of the pivoted frame, and on the cross rod 21 is slidably mounted a block 22 having a wire loop 23 secured therein, the wire loop passing through and slidably fitting the slot 19a in the rod 19, as clearly indicated in Figs. 1 and 3, and the loop extending upwardly from the pivoted frame and curving rearwardly towards the shaft of the reel 3. Moreover, the sliding block 22 is provided with end flanges 22a which engage opposite sides of the guide pulley 18, as clearly shown in Fig. 2, so as to cause the block 22 and consequently the wire loop 23 to reciprocate in unison with the guide pulley 18, said guide pulley 18 having a lip in its bore engaging the double ended worm 16a of shaft 16, whereby, as the pulley is rotated, the same will be simultaneously reciprocated back and forth with respect to and parallel with the reel shaft 3c, and the wire loop 23 which is normally interposed between the guide pulley 18 and the reel shaft 3c will move in unison therewith so as to be maintained at all times in alignment with the pulley 18.

By the above construction, the attachment may be readily attached to a conventional fishing reel, and will provide a pivoted frame for supporting the guide pulley 18 adjacent the fishing pole reel 3, the fishing line L passing through the loop 23. When in normal position shown in full lines in Fig. 1, the pivoted frame 14 carrying the guide pulley 18 would be engaged by the line L and when drawing in the line by actuation of the reel crank 3p the line L will make frictional contact with the periphery of guide pulley 18, causing the guide pulley and the loop 23 to be reciprocated back and forth across the reel shaft 3c. Thus at any time when the line L is being reeled in, the level winding attachment when in position shown in Fig. 1 will cause the line to be wrapped uniformly without tangling around the reel shaft 3c, throughout the entire length of the reel drum instead of being wrapped around the reel shaft at only one point, the reciprocatory movement of the loop 23 causing the line L to wind up on the reel shaft in even layers. Whenever it is desired to free the line from the guide pulley 18, as would be the case in event the fish, after striking, would start to rapidly pay out the line from the reel, the operator may, by merely using his thumb, shift the attachment into the position shown in dotted lines in Fig. 1, in which position the line L would still pass through the loop 23 but would be free from frictional contact with the pulley 18, and thus the pulley and eye would be prevented from reciprocatory movement, and the line could therefore be paid out rapidly without drag or interference as far as the level winding attachment is concerned.

As shown in Figures 3 and 4, instead of utilizing the bracket 12, the base plate 10 may be secured directly to the pair of spaced cross bars 3x of the reel proper by utilizing a pair of closed clamps 30, shown more particularly in Fig. 4, the same having slots 30a in their bases for the passage of the screws or bolts 11 and having opposed hooks 30b adapted to underlie the cross bars 3x of the fishing reel, as shown in Fig. 3. Owing to the use of the slots 30a in the bases of the opposed clamps 30, the jaws may be adjusted to suit different widths or spacings of the cross bars 3x. Thus the arrangement shown in Figs. 3 and 4 further adapt the attachment to any types of fishing lines in which for some reason it is not practical to utilize the bracket 12 shown in Figs. 1 and 2.

The invention is not limited to the exact forms shown in the drawings, for obviously changes may be made therein within the scope of the claims.

What is claimed is:

1. A level winding attachment for fishing reels, comprising a base plate adapted to be mounted on a fishing reel; a frame pivotally mounted on said base plate; a shaft fixedly mounted in the frame adjacent its outer end and having a double ended worm therein; a guide pulley reciprocably mounted on said shaft engaging the worm; a second shaft mounted in the frame parallel with the first shaft; a block reciprocably mounted on the second shaft and connected for reciprocatory movement with the guide pulley; a guide in the frame adjacent the second shaft; and a guide loop carried by the block and slidably engaging the guide, said loop extending beyond the pulley and curving towards the reel.

2. For a fishing rod having a reel provided with end plates connected by pairs of cross bars and having a reel shaft for the fishing line journaled in the end plates; a level winding attachment comprising a base plate adapted to be mounted on one pair of cross-bars; a frame pivotally mounted on said base plate; a shaft fixedly mounted in the frame adjacent its outer end parallel with and opposite the reel shaft and having a double ended worm therein; a guide pulley for the fishing line reciprocably mounted on said shaft engaging the worm; a second shaft mounted in the frame parallel with the first shaft; a block reciprocably mounted on the second shaft and connected for reciprocatory movement by and with the guide pulley; a guide in the frame parallel with the second shaft; and a guide loop for the fishing line carried by the block and slidably engaging the guide, said loop extending beyond the pulley and curving towards the reel, whereby when the frame is swung adjacent the reel the fishing line between the reel and outer end of the rod will frictionally contact the periphery of the guide pulley to cause reciprocation of the pulley and loop during reeling and unreeling of the line, and whereby when the frame is swung away from the reel the pulley will be free from the line and the pulley and loop will remain stationary.

3. In an attachment as set forth in claim 2, said base plate having a pair of bores therethrough adjacent its center; a pair of opposed clamps having hooks engaging a pair of cross bars, and having overlying bases provided with slots registering with the bores of the base plate; and securing means passing through said bores and slots.

4. In an attachment as set forth in claim 2, said base plate having a pair of threaded bores therein adjacent its center; a bracket plate overlying the base plate and having a pair of slots therein registering with the bores; securing means passing through said bores and slots; the upper end of the bracket plate being hooked to engage one of the pair of cross bars; the lower end of the bracket plate having an outturned arcuate flange overlying the fishing rod; and a contractible clamp member around the rod and arcuate flange.

5. For a fishing rod having a reel provided with end plates connected by pairs of cross bars and having a reel shaft for the fishing line journaled in the end plates; a level winding attachment comprising a base plate adapted to be mounted on one pair of cross-bars and having outturned ears at its ends; a frame pivotally mounted in said ears; a shaft fixedly mounted in the frame adjacent its outer end parallel with and opposite the reel shaft and having a double ended worm therein; a guide pulley for the fishing line, reciprocably mounted on said shaft engaging the worm; a second shaft mounted in the frame parallel with the first shaft; a block reciprocably mounted on the second shaft and connected for reciprocatory movement by and with the guide pulley; a slotted guide in the frame parallel with the second shaft; and a guide loop for the fishing line carried by the block and slidably engaging the slotted guide, said loop extending beyond the pulley and curving towards the reel, whereby when the frame is swung adjacent the reel the fishing line between the reel and outer end of the rod will frictionally contact the periphery of the guide pulley to cause reciprocation of the pulley and loop during reeling and unreeling of the line, and whereby when the frame is swung away from the reel the pulley will be free from the line and the pulley and loop will remain stationary.

6. In an attachment as set forth in claim 5, said base plate having a pair of bores therethrough adjacent its center; a pair of opposed clamps having hooks engaging a pair of cross bars, and having overlying slotted bases registering with the bores of the base plate; and bolts passing through said bores and slots.

7. In an attachment as set forth in claim 5, said base plate having a pair of threaded bores therein adjacent its center; a bracket plate overlying the base plate and having a pair of slots therein registering with the bores; bolts passing through said bores and slots; the upper end of the bracket plate being hooked to engage one of the pair of cross bars; the lower end of the bracket plate having an outturned arcuate flange overlying the fishing rod; and a split clamp around the rod and arcuate flange.

ALICE VIRGINIA UREY,
*Executrix of Estate of Paul M. Eaby, Deceased.*